United States Patent

[11] 3,608,057

| [72] | Inventors | Harris J. Bixler<br>Lexington;<br>Mary Ann Kendrick, Cambridge, both of Mass. |
|---|---|---|
| [21] | Appl. No. | 672,467 |
| [22] | Filed | Oct. 3, 1967 |
| [45] | Patented | Sept. 21, 1971 |
| [73] | Assignee | Amicon Corporation<br>Lexington, Mass. |

[54] PROCESS FOR MAKING CONTACT LENSES
4 Claims, No Drawings

[52] U.S. Cl. ................................................. 264/322,
260/29.6, 260/30.8, 260/31.2, 260/31.6, 260/32.6,
260/33.4, 264/343

[51] Int. Cl. ..................................................... B29b 3/00,
B29c 25/00, C08f 45/34, C08f 45/36, C08f 45/44,
C08f 45/46

[50] Field of Search ............................................ 264/1, 343,
322; 260/29.6 WU, 874, 33.4

[56] References Cited
UNITED STATES PATENTS

| 3,157,717 | 11/1964 | Thommes..................... | 264/343 |
| 3,271,496 | 9/1966 | Michaels....................... | 260/29.6 |
| 3,361,858 | 1/1968 | Wichterle..................... | 264/1 |
| 3,408,429 | 10/1968 | Wichterle..................... | 264/1 |
| 2,832,746 | 4/1956 | Jackson......................... | 260/874 |
| 3,324,068 | 6/1967 | Michaels....................... | 260/30.6 |

*Primary Examiner*—Donald J. Arnold
*Assistant Examiner*—Arthur H. Koeckert
*Attorney*—R. W. Furlong

ABSTRACT: A process for making an article, and the articles formed thereby from an ionically cross-linked polymer; said process comprising the essential steps of forming a composition comprising a said polymer and a nonvolatile organic plasticizer therefor, forming said article by molding and/or machining steps, leaching said plasticizer from the formed article, and replacing it with water or an aqueous solution. The process is particularly useful in the manufacture of a novel contact lens because it results in articles of unexpectedly good color characteristics and a high water content which had never before been achieved.

PROCESS FOR MAKING CONTACT LENSES

BACKGROUND OF THE INVENTION

Ionically-crosslinked polymers of the type synthesized from reaction of polyanions with polycations, i.e. polyelectrolyte complex resins, have been known for some time. Because of their apparent physiologically compatible nature, these resins have been suggested for use in a wide variety of articles requiring such compatibility. For example it has been suggested that such resins be used in making contact lens, synthetic cartilage, blood-handling devices and the like. One problem in forming such articles has been that their low modulus makes them rather difficult to handle and limits the nature of the stresses which can be effectively applied to them during conventional forming operations. Moreover, methods previously used in forming articles of polyelectrolyte complex resins were not suitable for the production of articles possessing both a high water content and good color properties.

Therefore, it is a principal object of the present invention to provide a process whereby (hydrated) ionically cross-linked, polyelectrolyte complex resins may be subjected to forming operations such as molding and machining with minimum probability of damage to the articles being formed.

It is a further object of the invention to provide means for forming articles of hydrated polyelectrolyte complex resins without the discoloration of such resins.

Still another object of the invention is to provide shaped articles of polyelectrolyte resin comprising a major portion of water.

Another object of the invention is to provide novel, machinable articles formed, in part, of polyelectrolyte resins.

These objects have been substantially achieved by a novel process wherein a hydrated polyelectrolyte complex resin is modified by:

1. replacing a major portion of the water content thereof with a polar liquid characterized by (1) its ability to plasticize the ionically-bound polyelectrolyte resin and (2) its nonvolatility in the environment to which the polyelectrolyte resin is to be formed,
2. subjecting the thus-plasticized resin to forming steps, and
3. replacing the plasticizer with water.

The aforementioned replacements means substantial replacement. Complete replacement is neither economic nor necessary to obtain advantages according to the invention.

Typical of the suitable plasticizers which may be utilized are glycerine, ethylene glycol, propylene carbonate, dimethyl sulfoxide, dimethyl formamide, ethylene glycolesters and N, N, N', N' tetrakis-hydroxy propyl ethylenediamine.

The plasticizers are characterized by their high water miscibility and a low vapor pressure. They are also characterized by their Solvent Solubility Parameters, based on cohesive energy densities, of over 10.

When machining operations are contemplated, glycerol is particularly advantageous because it greatly increases the 2 percent-secant modulus of the polyelectrolyte resin over and above the modulus of the same when the resin is water saturated. For example, a neutral hydrated polyelectrolyte complex resin containing 72 percent water and having a 2 percent-secant modulus of 1,600 p.s.i. is converted into a resin with an 11,000 p.s.i. modulus on substitution of glycerol for its water content. Moreover the tensile strength of the resin is increased from 150 to 370 p.s.i. when glycerol is substituted for water according to the process of the invention.

Other plasticizers which do not contribute such high moduli may be used during molding steps providing their vapor pressures are not so high as to cause bubbling.

The invention has been found to be particularly useful in the formation of contact lens from polyelectrolyte complex resins. It has been found that the process allows formation of lenses having a higher water content and, consequently, higher permeability to moisture vapor, oxygen and the like. Moreover, cracking and chipping of the lens during its forming has been very nearly eliminated. This advantage is, it seems, partly due to the improved machineability of the material being processed and partly due to the improved handling characteristics during such machining which improved characteristics markedly decrease the care and skill required to finish a suitable lens. Still another advantage has been the surprisingly good color characteristics of lenses produced by the instant process. Such lenses are clear and essentially colorless whereas polyelectrolyte resin lenses produced according to the prior art had been characterized by an undesirable brownish coloration.

The following specific working example is set forth for purposes of illustration only and is not to be interpreted as limiting variations in process conditions and choice of materials; on the contrary those skilled in the art, on reading this disclosure, will be able to select various polyelectrolyte resins and plasticizers to meet the particular problem with which they are faced.

WORKING EXAMPLE

A so-called "casting solution" was prepared of:

| | Parts by weight |
|---|---|
| Ethanol | 2.8 |
| Water | <2.0 |
| $H_2SO_4$ | 1.5 |
| Resin | 0.7 |

The resin is an ionically cross-linked polyelectrolyte resin formed of poly (sodium styrene sulfonate) and poly (vinyl benzyltrimethylammonium chloride) according to the disclosure in U.S. Pat. No. 3,271,496.

The casting solution was drawn down to form a liquid film of about 58 mils in thickness. The volatile components of the drawn film were then driven off at low humidity in a dry-box. Next the "dry" film was leached to remove residual acid. Thus processed, the film was about 10 mils thick and consisted of about 34 percent resin and 66 percent water. It was placed in a glycerol bath for 2 hours at about 25° C., during which time the water was largely replaced by glycerine.

Next the glycerine-containing film was preheated to 190° F. for 10 minutes and then molded into a contact lens under a pressure of 2,000 p.s.i. and at a mold temperature of 190° F. The molded lens was about 8 mils in thickness. After equilibrating it in a water bath for 2 hours at 25° C. the water-equilibrated lens contained 59 percent water.

When the same procedure was followed, excepting that the molding was done without replacing the water with glycerine, the water-equilibrated lens contained only 36 percent water and had a brownish cast to it.

The polyelectrolyte complex resins to which the process of the invention is directed include both neutral, i.e. iconically balanced between polycations and polyanions, and nonneutral resins. There are some applications, such as, for example the preparation of antithrombogenic articles, wherein an excess of polyanion is often desirable.

Among the polymers containing dissociable cationic groups which may be used as ingredients in preparing the ionically cross-linked polyelectrolytes of the present invention are poly (ethylene methyloxonium) chloride, poly (vinyl dimethyloxonium chloride, poly (vinyl benzyldimethyl sulfonium) chloride, poly (vinyl benzyltrimethyl phosphonium) chloride, poly (vinyl dimethyloxonium) chloride, polyvinyl pyridinium chloride, poly (diallyl dimethyl ammonium chloride), and the like. Among the polymers containing anionic groups which may be used in preparing the polyelectrolyte used in the present invention are poly (alpha-fluoro acrylic acid). poly (2,2-dichloro- 3 butenoic acid), poly (4- vinylphenyl difluoro acetic acid), polyvinyl sulfuric acid, polyvinyl sulfonic acid, polyvinyl methylol sulfonic acid, polyvinyl toluene sulfonic acids, polystyrene sulfonic acid, poly-alpha-methylstyrene sulfonic acid, and the dissociable salts of such acids, preferably the sodium or potassium salts thereof. Of these the sulfonic acid polymers and their alkali metal salts are preferred.

What is claimed is:

1. A process for forming shaped articles of a hydrated resin formed of two ionically cross-linked synthetic organic linear polymers, one of said polymers containing dissociable anionic groups and the other containing dissociable cationic groups, said ionic crosslinkages being the sole crosslinkages present, which process comprises
   a. substituting for the water content of said hydrated resin an organic water-miscible plasticizer selected from the group consisting of glycerine, ethylene glycol, propylene carbonate, dimethyl formamide, ethylene glycol esters, and N, N, N', N'-tetrakis (hydroxypropyl) ethylene diamine,
   b. forming a shaped article from said resin, and
   c. substituting water for said plasticizer thereby rehydrating said resin.

2. A process as defined in claim 1 whereby said substituting steps are accomplished by equilibrating the resin in a bath of the liquid with which the substitution is to be made.

3. A process as defined in claim 1 wherein the plasticizer is glycerine.

4. A process as defined in claim 1 wherein the polyelectrolyte complex resin is a complex of poly (sodium styrene sulfonate) and poly (vinyl benzyltrimethyl (ammonium chloride).

UNITED STATES PATENT OFFICE
CERTIFICATE OF CORRECTION

Patent No. 3,608,057          Dated September 21, 1971

Inventor(s) Harris J. Bixler and Mary Ann Kendrick

It is certified that error appears in the above-identified patent and that said Letters Patent are hereby corrected as shown below:

Column 1, line 48, "glycolesters" should be two words;

Column 2, line 56, "nonneutral" should be hyphenated;

Column 4, claim 4, line 12, delete parenthesis before "ammonium" and make "benzyltrimethyl" --benzyltrimethylammonium--.

Signed and sealed this 4th day of July 1972.

(SEAL)
Attest:

EDWARD M. FLETCHER, JR.
Attesting Officer

ROBERT GOTTSCHALK
Commissioner of Patents